UNITED STATES PATENT OFFICE.

ALBERT PIETZSCH AND GUSTAV ADOLPH, OF HOELLRIEGELSKREUTH, NEAR MUNICH, GERMANY.

PROCESS OF PRODUCING HYDROGEN PEROXID.

1,083,888.　　　　　Specification of Letters Patent.　　Patented Jan. 6, 1914.

No Drawing.　　Application filed June 20, 1913.　Serial No. 774,816.

*To all whom it may concern:*

Be it known that we, ALBERT PIETZSCH and GUSTAV ADOLPH, citizens of Germany, residing at Hoellriegelskreuth, near Munich, Bavaria, Germany, have invented certain new and useful Improvements in Processes of Producing Hydrogen Peroxid; and we do hereby declare the following to be a full, clear, and exact description of the invention, such as will enable others skilled in the art to which it appertains to make and use the same.

Several attempts have heretofore been made to directly oxidize steam so as to produce hydrogen peroxid. Practically useful results have not been obtained, as the method adopted, of highly heating the steam by means of electrically heated appliances, and then rapidly cooling, resulted only in very slight formation of hydrogen peroxid. It is, however, quite practicable to convert a large proportion of steam into hydrogen peroxid by blowing the same through or over suitable oxidizing agents. Specially suitable for this purpose is a mixture of persulfate and sulfuric acid, and it is quite adequate if the persulfate is only moistened with dilute sulfuric acid.

Example: Steam at an absolute pressure of 22cm. mercury is passed through a mixture of 6 kg. potassium persulfate and 1 l. sulfuric acid of specific gravity 1.5 and is then condensed.

Claim.

The herein described process of producing hydrogen peroxid, which process consists in subjecting a mixture of persulfate and sulfuric acid to the action of steam, whereby the steam heats said mixture and reacts directly therewith to form hydrogen peroxid vapor.

In testimony whereof we hereunto affix our signatures in the presence of two witnesses.

ALBERT PIETZSCH.
　　　　Dr. GUSTAV ADOLPH.

Witnesses:
　A. V. W. COTTER,
　JOHANNA STERN.